M. ACKERMAN ETAL

PULSE CODE DETECTOR HAVING A DELAY LINE FOR DETECTING PULSE SPACING

Filed April 11, 1963

INVENTORS
MARVIN ACKERMAN
DAVID R. DOMKE
BY Lippincott, Ralls & Hendricson
ATTORNEYS United States Patent Office 3,293,606

Patented Dec. 20, 1966

3,293,606
PULSE CODE DETECTOR HAVING A DELAY LINE FOR DETECTING PULSE SPACING

Marvin Ackerman, Sunnyvale, and David R. Domke, Jr., Cupertino, Calif., assignors to Admiral Corporation, Chicago, Ill., a corporation of Illinois Filed Apr. 11, 1963, Ser. No. 272,363
9 Claims. (Cl. 340—167)

This invention relates to apparatus for decoding multiple pulse signals. More specifically, the apparatus of the invention distinguishes a signal having four pulses at predetremined equally-spaced intervals, from other signals and extraneous noise. One application of the apparatus of this invention is used for decoding emergency signals.

Much equipment for distinguishing between a predetermined signal and other signals is well known in the art. In particular, reference is made to U.S. Patents 2,984,789 and 2,969,430. Since the common feature of such prior art apparatus is its ability to recognize a series of pulse intervals, standard practice has been to use a separate delay line for each pulse of the signal except the last. Thus, for a four-pulse signal, three delay lines are used (see FIG. 1 of U.S. Patent 2,984,789). One delay line will delay the first pulse, one will delay the second, and one will delay the third. These delays are each of a calculated length sufficient that when the outputs of the three delay lines are coincident, the desired four-pulse signal with proper pulse spacing must have been received at the input. It is of course possible to use a tapped delay line in place of the three separate delay lines; however, the total delay time provided by such a tapped line must still be at least the sum of the three pulse intervals.

This invention provides novel apparatus which eliminates two of the three previously required delay lines (or two-thirds of the length of a triple-length tapped delay line). Yet the apparatus described below will accomplish the same decoding as the prior art apparatus without loss of accuracy.

Essentially, the invention makes triple use of the same delay line. A pulse coincident in time with the first signal pulse, is delayed by passing it forward through the delay line; a second pulse, coincident with the second signal pulse but of opposite polarity from the first pulse, is also delayed by passing it forward through the line; a third pulse, coincident with the third signal pulse, is delayed by passing it backward (from output to input) through the same delay line. The proper coincidences between these three delayed pulses and the signal pulses next following each of the original three signal pulses are detected by coincidence gates, and an output signal is transmitted when all the required coincidences occur.

In the illustrated embodiment of this invention, the input signals are transmitted to a phase inverter. Although such devices are conventional, further description may be obtained from the Handbook of Semiconductor Electronics, edited by Lloyd P. Hunter (McGraw-Hill Book Company, York, Pennsylvania, 1062), hereinafter called the "Handbook," on pages 11–93. Such a phase inverter has two outputs: one provides pulses coincident in time and also identical in polarity to the signal pulses (termed the positive output); and the other provides pulses coincident in time but opposite in polarity to the signal pulses (termed the negative output). The pulses provided by the negative output may be passed on to one input of a delay line. Such delay lines are well known in the art; the delay line is designed to provide a delay approximately equal to the spacing between any two successive signal pulses. An output pulse from the delay line which entered in coincident with a signal pulse should therefore be coincident with the next following signal pulse as it emerges from the delay line. This coincidence is checked by a first coincidence gate, or "AND-gate" (Handbook, pages 15–38). The AND-gates used in this invention provide a positive pulse at their output if, and only if, a pulse of the correct polarity is applied simultaneously to each of the input leads. The AND-gates used in this invention have only two inputs each.

An output pulse from the first AND-gate, indicating the first coincidence, is passed to the input of the single delay line. This pulse, however, is of the polarity opposite from the previous pulse passed to the delay line from the phase inverter. This inverted output pulse from the coincidence gate should reach the output end of the delay line coincident with a third signal pulse. This coincidence is tested by a second coincidence gate which also produces a positive output pulse. The output pulse from the second coincidence, or AND-gate, is inverted by an inverter (Handbook, pages 15–19). The resulting negative pulse is then preferably amplified by any conventional method. For example, the inverter used may be a vacuum tube or common emitter transistor amplifier stage, providing both inversion and amplification. The inverted and amplified pulse is passed into the output end of the delay line so that it will pass backward through the line. The pulse will thus emerge at the forward end coincident with the receipt of the fourth signal pulse. This third coincidence is measured by a third AND-gate, which detects the coincidence indirectly by checking the coincidence of the pulse emerging from the forward end of the delay line and the output pulse from the first coincidence gate (which latter pulse, in turn, is coincident with the fourth signal pulse).

An output pulse from the third AND-gate indicates the presence of the requisite four-pulse signal at the input of the apparatus. This output pulse may be used to indicate the presence of the desired input signal directly, or additional equipment may be employed for greater security or accuracy, as will be set forth later. A margin of safety, for example, may be obtained by requiring more than one output pulse within a given time period from the third AND-gate in order to cause an emergency signal. The output pulses from the third AND-gate may thus be stored until the required number has been transmitted—an emergency signal will then be given.

A complete understanding of this invention may be gained from consideration of the following detailed description and the accompanying drawing, in which.

Figure 1:
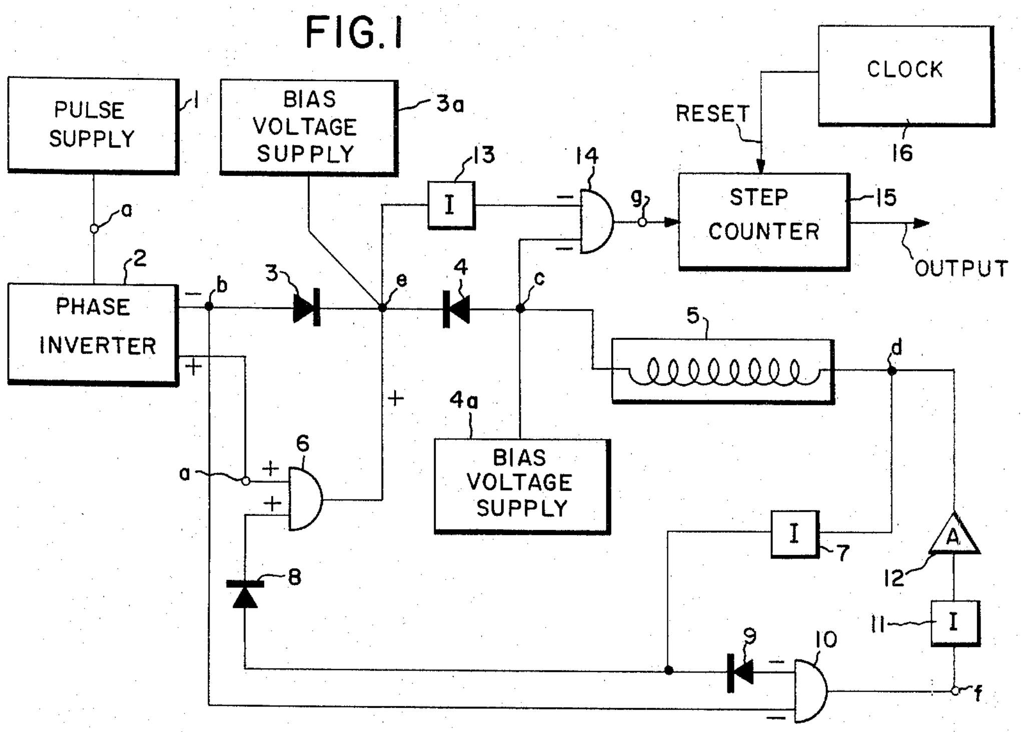
FIG. 1 depicts a block diagram of one specific embodiment of the invention.
Figure 2:
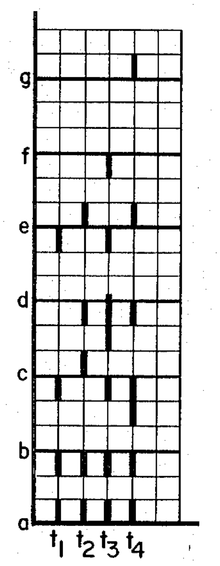
FIG. 2 is a diagram showing the time relationships of various pulses at different points labeled with small letters in the circuit of FIG. 1.

Referring now to both FIGS. 1 and 2, the signal pulses are received from some form of receiver, shown as pulse supply 1. This pulse supply is usually a radio receiver or other scanning equipment. Such a pulse supply will, more than likely, supply many signals other than the four-pulse signal indicating an emergency. Some signals may be sent deliberately, others may be only random noise. It is most unlikely that the four-pulse signal with the required pulse-spacing would appear inadvertently; yet even this possibility is guarded against, because the signal is always repeated when it is sent deliberately. Requiring more than one output from the decoder to suggest an emergency (since each four-pulse signal produces one such output) eliminates the possibility of a single inadvertent signal causing an emergency alert.

The desired four-pulse signals from the pulse supply are shown in FIG. 2 on abscissa *a*. The points on the circuit of FIG. 1 where this signal appears are also designated with the letter *a*. In the embodiment illustrated, the four pulses are all positive as received; it is equally possible to decode negative signals satisfactorily—appropriate phase inversions would be made in the subsequent equipment (to be described), as will be apparent to the reader skilled in the art. Such an inversion may often be made by a shift from PNP to NPN transistors (along with proper biasing changes). For the purposes of this description, however, it will be assumed that the desired signal—the one producing an output—will always consist of four equally-spaced positive pulses. Conventional spacing for emergency signals is 24.65 $\mu$s; such spacing is clearly not critical to the invention, because the delay line length may be modified to accommodate any desired spacing.

The pulses from the pulse supply are passed to phase inverter 2. Phase inverter 2 has two outputs, termed a positive output and a negative output. The positive output produces a pulse sequence identical to that shown as *a* in FIG. 2. The negative output is shown as sequence *b*, which is identical to *a* except for being inverted. The first negative pulse at point *b*, coincident wtih the first signal pulse, passes at time $t_1$ through properly-biased diodes 3 and 4 (whose purpose will be explained later in this specification) into delay line 5. Bias supplies *3a* and *4a* supply the necessary bias voltages. Diodes 3 and 4, although of opposite polarity to each other, are so biased as to pass the negative pulses from the phase inverter to the delay line. However, a change in this bias voltage such that negative pulses are blocked by diode 3 will occur upon receipt of a positive pulse (from AND-gate 6) at point *e*. This action will be discussed later. At the present time in the sequence ($t_1$), none of the AND-gates has the necessary input pulses to provide such an output pulse.

Delay line 5 provides a time delay approximately equal to the pulse spacing—e.g., about 24.65 $\mu$s. Thus, the first negative pulse from the negative output of the phase inverter 2, appearing at points *b* and *c* coincident ($t_1$) with the first signal pulse, will also appear at point *d* (the delay line output) at time $t_2$. Since the delay is approximately equal to the pulse spacing, time $t_2$ is the identical moment that the second signal pulse appears at pulse supply point *a*, as shown in sequence *a* of FIG. 2. The negative pulse at point *d* is inverted by inverter 7 to become a positive pulse which passes through diode 8 (which has the polarity to pass such a pulse) and appears at the lower input of AND-gate 6. AND-gate 6 will produce an output pulse only when its other input also receives a pulse of the proper polarity (positive.) The other input is connected to receive such a positive pulse from the output of phase inverter 2.

A positive pulse from inverter 7 is coincident ($t_2$) at the lower input of AND-gate 6 with the positive pulse (from phase inverter 2) at the upper input. Both are coincident with the second signal pulse; together they cause AND-gate 6 to produce a positive output pulse at time $t_2$. This positive output pulse appears at point *e*, and is shown in sequence *e* of FIG. 2. At the same time ($t_2$), the second negative pulse (from phase inverter 2) will appear at point *b*, coincident with the second signal pulse. This negative pulse, together with the coincident positive pulse from AND-gate 6 at point *e*, will reverse the bias on diode 3. Now diode 3 will no longer pass negative pulses, and the second negative pulse (from phase inverter 2) is thereby blocked.

Diode 4 is biased (by biasing means *3a* and *4a*) to pass either positive or negative pulses toward the delay line, unless a negative pulse (emerging from the input of the delay line) should appear at point *c*. Such a negative pulse would reverse the bias on this diode, causing it to block all pulses. (This point will be explained more fully later in the specification.) As a consequence, the positive pulse from AND-gate 6 (which caused diode 3 to block the negative pulse from phase inverter 2) will pass through diode 4 and into delay line 5. At this time in the sequence ($t_2$), sequence *c* of FIG. 2 shows that no negative pulse exists at point *c* to change the biasing of diode 4.

At time $t_2$, then, the positive pulse from AND-gate 6 passes through diode 4 into delay line 5. At time $t_3$, this positive pulse emerges at the output end of the delay line, coincident with the next ($t_3$ signal pulse. This positive pulse, emerging from delay line 5, is very short-lived. It is inverted by inverter 7, becoming a negative pulse; but a negative pulse never reaches AND-gate 6 because of diode 8 which blocks such negative pulses. This negative pulse from inverter 7 passes through diode 9 (of the proper polarity to pass negative pulses) to the upper input of AND-gate 10. The negative pulse is coincident at $t_3$ with the third signal pulse, and thus with the third pulse from inverter 2 at point *b*. This negative pulse appears at the lower input of AND-gate 10; thus AND-gate 10, which requires two negative pulses at its inputs, produces an output pulse. Since all the gates used in the illustration have positive output pulses (although this feature is not necessary), an inverter 11 is employed to invert the positive output pulse of AND-gate 10 to result in a negative pulse. If AND-gate 10 had normally a negative output pulse, this inverter would not be needed. The inverted pulse is amplified by amplifier 12. All of these operations upon the positive output pulse from the delay line 5 occur approximately at $t_3$. Although the pulse emerging from the line at point *d* was initially positive, it rapidly becomes negative as a result of these subsequent operations, which transmit a large negative pulse to point *d* from amplifier 12. The nearly-coincident, but much larger, negative pulse emerging from amplifier 12 effectively inverts the polarity of the pulse at point *d* (at time $t_3$). A close examination of waveform *d* in FIG. 2 will show this shift in polarity. Note that the second pulse (appearing at point *d* at time $t_3$) is negative, but has a slight positive extension which is the result of the polarity having initially been postive. If the very small (relative to the pulse duration) time required for the positive-to-negative shift were magnified, a "spike" would appear on the graph, as is well known in the art.

At the same time ($t_3$) as the large negative pulse appears at *d*, the third signal pulse appears. At that time, a negative pulse from inverter 2 passes directly to the delay line 5. No blocking pulse can appear from AND-gate 6 at $t_3$ because there is no lower input through diode 8, as discussed above. Thus, at $t_3$, a negative pulse from inverter 2 enters the input of delay line 5, passing forward, while an amplified negative pulse enters from amplifier 12, passing backward. The two pulses both pass through the delay line; they meet in the center and pass on, unaffected by their meeting.

At time $t_4$, both of these pulses will emerge at opposite ends of the line. The negative pulse from inverter 2 appears at point *d* at the output of the line (see FIG. 2, sequence *d*). The amplified negative pulse appears at the input of the line, at point *c* (see FIG. 2, sequence *c*). At the same time ($t_4$), the fourth signal pulse appears from pulse supply 1. Phase inverter 2 then provides a positive pulse at the upper input of AND-gate 6 and a negative pulse at point *b*. The negative pulse at the output of the line (point *d*) is simultaneously inverted by inverter 7; a positive pulse thus passes through diode 8 to the lower input of AND-gate 6, which then has a positive output pulse because of the coincidence (at $t_4$) of the positive pulse from diode 8 at one input with the positive pulse from inverter 2 at the other—all coincident with the fourth signal pulse. The output pulse from AND-gate 6 at $t_4$ appears at point *e* (see FIG. 2, sequence *e*). Diode 3 blocks the fourth incoming negative pulse from inverter 2 because the biasing is reversed by the positive pulse from AND-gate 6 at point *e*. At this time ($t_4$), the amplified negative pulse which entered the output end of the delay line 5 at time $t_3$ emerges from the input end of the line at point *c*. The negative pulse at point *c* reverses the biasing of diode 4, as explained earlier. Diode 4 now blocks any pulses attempting to pass through it, and thereby separates the positive pulse at point *e* from the negative pulse at point *c*.

The positive pulse at point *e* (from AND-gate 6) passes to and is inverted by inverter 13 to become a negative pulse with the proper polarity for an input to AND-gate 14. The coincidence at $t_4$ of the negative pulse from inverter 13 with the negative pulse at point *c* (from the delay line) causes AND-gate 14 to produce an output pulse (see FIG. 2, sequence *c*).

This output pulse from AND-gate 14 can occur only after the receipt of four properly spaced pulses. It is apparent that if the spacing were not proper (equal to the delay of delay line 5) at least one pair of pulses would not be coincident at AND-gates 6, 10, or 14; in that event, AND-gate 14 could not have an output pulse. Furthermore, if one of the pulses were missing, so that the sequence were incomplete, the chain of coincidences would be broken, and AND-gate 14 again could have no output pulse. An output pulse from AND-gate 14 indicates the receipt of the four-pulse emergency signal.

Various conventional devices may be connected to the output of AND-gate 14. For instance, a threshold circuit might be employed to prevent passage through AND-gate 14 of any extraneous circuit noise which might be construed as an output signal. Such a circuit might use a transistor amplifier which required a specified input level (presumably obtainable only when AND-gate 14, in response to the desired four input pulses, produces a real output signal).

Moreover, it will often prove desirable to avoid sounding an alarm on the very first output signal from AND-gate 14, even though the exact desired pulse sequence has been received, because random noise signals can easily combine into a predetermined signal. However, a genuine emergency signal will be continually repeated in transmission; thus, as insurance, the alarm may be sounded only after receipt of more than one such signal. Each output pulse of AND-gate 1 (representing the receipt of one emergency signal group with the four properly-spaced pulses) is passed to a step counter 15 (a device well known in the art). The number of counts used to determine a genuine emergency should not be too large, because a long wait for additional confirming signals might cause undue delay in responding to the emergency, or involve some danger of the emergency transmitter prematurely ceasing to transmit. The exact number of counts used will involve consideration of these factors, and of the degree of accuracy desired. At predetermined intervals, step counter 15 is reset by pulses from a conventional clock pulse generator 16. The intervals should be longer than approximately twice the time needed to obtain the desired number of emergency signals (in order to prevent their obliteration). Such continual resetting of the counter prevents combination of multiple extraneous signals—occurring at long intervals—to yield an undesired emergency signal. The shorter these intervals are made, subject to the above limitation, the less will be the chance of error from combined extraneous signals. Step counter 15 will then have an output whenever the required number of pulses has been received from AND-gate 14 between its resettings. The alarm is then immediately sounded.

It should be here noted that the order of the pulse transmission through the apparatus of the invention may be altered. For example, the first pulse might be passed backward through the delay line, and the third pulse passed forward. However, each operation of the above sequence would still be carried out, although the sequential order might be changed, if a four-pulse signal were being used. For such a signal, it is essential that at least one pulse passing through the delay line be reversed in polarity from another pulse passing through the delay line in the same direction. Additionally, at least one pulse should pass through the delay line in a direction opposite to that of another.

Additionally, it should be noted, the inventive concepts illustrated by the preferred embodiment described in detail are also applicable to decoding of signals having fewer than four pulses. A single delay line may also be used to decode equally-spaced three-pulse signals, for example. In this event one of the coincidence gates might then be eliminated. In the embodiment shown in FIG. 1, for example, coincidence gate 14 and its associated inverter 13 would be eliminated, and upon receipt of a signal having three equally-spaced pulses, the output pulse of coincidence gate 10 would pass directly to step counter 15.

From the detailed description of one embodiment of the invention, one skilled in the art can devise various sequences which will be operative for various signals without departing from the spirit and scope of the invention. Therefore, the only limitations to be placed on that scope are those expressed in the claims which follow.

What is claimed is:

1. Apparatus for detecting signals having between three and four equally spaced signal pulses wherein the spacing between said pulses is approximately equal to the time required for a pulse to travel the length of a single delay line, said apparatus requiring as pulse-delaying means only said single delay line, which comprises:
   (a) a delay line of length approximately equal to the pulse spacing;
   (b) means for passing a first pulse into one end of said delay line time-coincident with one of said signal pulses;
   (c) means for passing a second pulse into the opposite end of said delay line time-coincident with a different one of said signal pulses;
   (d) means for detecting the time coincidence of said first pulse emerging from said opposite end of said delay line with the signal pulse next following said one pulse; and
   (e) means for detecting the time coincidence of said second pulse emerging from said one end of said delay line with the signal pulse next following said different pulse, thereby detecting the presence of all of said signal pulses.

2. Apparatus for detecting signals having between three and four equally spaced signal pulses wherein the spacing between said pulses is approximately equal to the time required for a pulse to travel the length of a single delay line, said apparatus requiring as pulse-delaying means only said single delay line, which comprises:
   (a) a delay line of length approximately equal to the pulse spacing;
   (b) means for passing a first pulse time-coincident with one of said signal pulses into one end of said delay line;
   (c) means for passing a second pulse of opposite polarity from said first pulse into said one end of said delay line time-coincident with a different one of said signal pulses;
   (d) means for detecting the time coincidence of said first pulse emerging from the opposite end of said delay line with the signal pulse next following said one pulse; and (e) means for detecting the time coincidence of said second pulse emerging from the opposite end of said delay line with the signal pulse next following said different pulse, thereby detecting the presence of all of said signal pulses.

3. Apparatus for detecting signals having four equally spaced signal pulses wherein the spacing between said pulses is approximately equal to the time required for a pulse to travel the length of a single delay line, said apparatus requiring as pulse-delaying means only said single delay line, which comprises:

(a) a delay line of length approximately equal to the pulse spacing;
(b) means for passing a first pulse into one end of said delay line time-coincident with a first signal pulse;
(c) means for passing a second pulse of opposite polarity from said first pulse into said one end of said delay line time-coincident with a second signal pulse;
(d) means for passing a third pulse time-coincident with a third signal pulse into the opposite end of said delay line;
(e) means for detecting the time coincidence of said first pulse emerging from the opposite end of said delay line with the signal pulse next following said first signal pulse;
(f) means for detecting the time coincidence of said second pulse emerging from the opposite end of said delay line with the signal pulse next following said second signal pulse; and
(g) means for detecting the time coincidence of said third pulse emerging from said one end of said delay line with the signal pulse next following said third signal pulse, thereby detecting the presence of all of said signal pulses.

4. Apparatus for detecting signals having four equally spaced signal pulses wherein the spacing between said pulses is approximately equal to the time required for a pulse to travel the length of a single delay line, said apparatus requiring as pulse-delaying means only said single delay line, which comprises:

(a) an input means for receiving input signal pulses;
(b) a delay line providing a pulse delay approximately equal to the spacing between pulses of said signal, said delay line having input and output ends;
(c) a first coincidence means detecting the time coincidence of each signal pulse and any pulse of one polarity of said output end of said delay line, said first coincidence means transmitting a first pulse of the opposite polarity into said input end of said delay line in the event of such coincidence;
(d) a second coincidence means detecting the time coincidence of each signal pulse and each of said first pulses transmitted by said first coincidence means reaching the output end of said delay line, said second coincidence means transmitting a second pulse into said output end of said delay line in the event of such coincidence; and
(e) a third coincidence means detecting the time coincidence of one of said first pulses being transmitted by said first coincidence means and said second pulse previously transmitted by said second coincidence means reaching the input end of said delay line after passing through said delay line in the reverse direction, said third coincidence means providing an output signal in the event of such coincidence which indicates the receipt by said input means for the required four-pulse signal.

5. Apparatus for detecting signals having four equally spaced signal pulses wherein the spacing between said pulses is approximately equal to the time required for a pulse to travel the length of a single delay line, said apparatus requiring as pulse-delaying means only said single delay line, which comprises:

(a) an input means for receiving input signal pulses;
(b) a delay line providing a pulse delay approximately equal to the spacing between pulses of said signal, said delay line having input and output ends;
(c) a means for transmitting a first pulse of one polarity into the input end of said delay line time-coincident with the receipt of a first signal pulse at said input means;
(d) a first coincidence means detecting the time coincidence of any even-number signal pulse and said first pulse previously transmitted by said transmitting means appearing at the output end of said delay line, said first coincidence means transmitting a second pulse of the opposite polarity into said input end of said delay line in the event of such coincidence;
(e) a second coincidenc means detecting the time coincidence of a third successive signal pulse and said second pulse transmitted by said first coincidence means reaching the output end of said delay line, said second coincidence means transmitting a third pulse into said output end of said delay line in the event of such coincidence; and
(f) a third coincidence means detecting the time coincidence of any of said second pulses being transmitted by said first coincidence means and said third pulse appearing at the input end of said delay line after passing through said delay line in the reverse direction, said third coincidence means providing an output signal in the event of such coincidence which indicates the receipt by said input means of the required four successive pulses.

6. Apparatus for detecting signals having four equally spaced signal pulses wherein the spacing between said pulses is approximately equal to the time required for a pulse to travel the length of a single delay line, said apparatus requiring as pulse-delaying means only said single delay line, which comprises:

(a) an input means for receiving input pulses;
(b) a delay line providing a pulse delay approximately equal to the spacing between pulses of said signals, said delay line having input and output ends;
(c) a means for transmitting a first pulse of one polarity into the input end of said delay line time-coincident with the receipt of a first signal pulse at said input means;
(d) a first coincidence means detecting the time coincidence of a signal pulse and said first pulse previously transmitted by said transmitting means appearing at the output end of said delay line, said first coincidence means transmitting a second pulse of the opposite polarity into said input end of said delay line in the event of such coincidence;
(e) a means for causing said second pulses of said opposite polarity at said input end of said delay line to override said first pulses of said one polarity at said input end of said delay line;
(f) a second coincidence means detecting the time coincidence of a signal pulse and said second pulse transmitted by said first coincidence means appearing at the output end of said delay line, said second coincidence means transmitting a third pulse into said output end of said delay line in the event of such coincidence;
(g) a means for separating said second pulse being transmitted by said first coincidence means and said third pulse appearing at the same time at the input end of said delay line after said third pulse has passed through said delay line; and
(h) a third coincidence means detecting the time coincidence of said third pulse and said second pulses at the input end of said delay line, said third coincidence means providing an output signal in the event of such coincidence which indicates the receipt by said input means of the four required successive pulses.

7. Apparatus for detecting signals having four equally spaced signal pulses wherein the spacing between said pulses is approximately equal to the time required for a pulse to travel the length of a single delay line, said apparatus requiring as pulse-delaying means only said single delay line, which comprises:

(a) an input means for receiving input pulses;
(b) a delay line providing a pulse delay approximately equal to the spacing between pulses of said signal, said delay line having input and output ends;
(c) a means for transmitting two pulses, one of each polarity, time-coincident with the receipt of each pulse at said input means;
(d) a means for transmitting one of said two pulses into the input end of said delay line;
(e) a first coincidence means detecting the time coincidence of the other of said two pulses being transmitted by said transmitting means and the previous said one of said two pulses appearing at the output end of said delay line after having passed through the line, said first coincidence means transmitting a second pulse of the opposite polarity from said one of said two pulses into said input end of said delay line in the event of such coincidence;
(f) a means for preventing said one of said two pulses from reaching the input end of said delay line when said first coincidence means transmits a second pulse;
(g) a second coincidence means detecting the time coincidence of said one of said two pulses being transmitted by said transmitting means and said second pulses appearing at the output end of said delay line, said second coincidence means transmitting a third pulse into said output end of said delay line in the event of such coincidence;
(h) a means for separating said second pulse being transmitted by said first coincidence means and said third pulse appearing simultaneously at said input end of said delay line after said third pulse has passed through said delay line; and
(i) a third coincidence means detecting the time coincidence of said third pulse and said second pulse at the input end of said delay line, said third coincidence means providing an output signal in the event of such coincidence which indicates the receipt by said input means of the required four successive pulses.

8. Apparatus for detecting signals having four equally spaced signal pulses wherein the spacing between said pulses is approximately equal to the time required for a pulse to travel the length of a single delay line, said apparatus requiring as pulse-delaying means only said single delay line, which comprises:

(a) an input means for receiving input pulses;
(b) a delay line providing a pulse delay approximately equal to the spacing between pulses of said signal, said delay line having input and output ends;
(c) a first transmititng means for transmitting two pulses, one of each polarity, coincident in time with the receipt of each pulse at said input means;
(d) a means for transmitting one of said two pulses into the input end of said delay line;
(e) a first coincidence means detecting the time coincidence of the other of said two pulses being transmitted by said transmitting means and the previous one of said two pulses appearing at the output end of said delay line after having passed through the line, said first coincidence means transmitting a second pulse of the opposite polarity from said one of said two pulses in the event of such coincidence, said first coincidence means having two inputs and an output;
(f) means transmitting the other of said two pulses to one input of said first coincidence means;
(g) means for transmitting the output pulses of said first coincidence means to the input of said delay line;
(h) a second coincidence means detecting the time coincidence of said one of said two pulses being transmitted by said first transmitting means and said second pulses appearing at the output end of said delay line, said second coincidence means transmitting a third pulse in the event of such coincidence;
(i) means for distinguishing at the output end of said delay line between said one of said two pulses of one polarity and said second pulses of the opposite polarity, and for transmitting the former pulses to the other input of said first coincidence means and the latter pulses to one input of said second coincidence means;
(j) means for transmitting said one of said two pulses to the other input of said second coincidence means;
(k) means transmitting the output pulses from said second coincidence means to the output end of said delay line;
(l) a means for preventing said one of said two pulses from reaching the input end of said delay line when said first coincidence means transmits a second pulse coincident in time with a signal pulse;
(m) a means for separating said second pulse being transmitted by said first coincidence means from said third pulse appearing simultaneously at said input end of said delay line after said third pulse has passed through said delay line;
(n) a third coincidence means detecting the time coincidence of said third pulse and said second pulse at the input of said delay line, said third coincidence means providing an output signal in the event of such coincidence which indicates the receipt by said input means of the required four successive pulses, said third coincidence means having two inputs;
(o) means connecting the input end of said delay line to one input of said third coincidence means; and
(p) means connecting the output of said first coincidence means to the other input of said third coincidence means.

9. Apparatus for detecting signals having four equally spaced signal pulses wherein the spacing between said pulses is approximately equal to the time required for a pulse to travel the length of a single delay line, said apparatus requiring as pulse-delaying means only said single delay line, which comprises:

(a) an input means for receiving input pulses;
(b) a phase inverter connected to said input means having two outputs, each providing pulses of polarity opposite to the other;
(c) a first coincidence gate having two inputs and an output, said gate having an output of one polarity upon receipt of input pulses at both its inputs of the same polarity;
(d) a delay line providing a pulse delay approximately equal to the spacing between pulses of said signal, said delay line having input and output ends;
(e) a first terminal;
(f) means for causing an output pulse of said one polarity from said first coincidence means to override a pulse of the opposite polarity from the first output of said phase inverter, said means coupling said first output with said first terminal;
(g) means coupling the second output of said one polarity of said phase invetrer to one input of said first coincidence gate;
(h) a second coincidence gate having two inputs and an output, said gate having an output pulse of said one polarity upon receipt of pulses of said opposite polarity at both its inputs;
(i) means coupling said first output of said phase inverter of said opposite polarity to one input of said second coincidence gate;
(j) means for inverting the polarity of the pulses at the output end of said delay line, said means coupling said output end with one input of said first and second coincidence gates;

(k) a second terminal;

(l) means separating the output pulses from said first coincidence gate from pulses emerging from the input end of said delay line, said separating means coupling said first and second terminals;

(m) amplifying means coupling the output of said second coincidence gate to the output end of said delay line;

(n) a third coincidence gate having two inputs and an output, said gate having an output pulse upon receipt of pulses of said opposite polarity at both its inputs;

(o) means coupling the input of said delay line to one input of said third coincidence gate; and (p) an inverter coupling said first terminal with the other input of said third coincidence gate, whereby the output signal from said third coincidence gate indicates the presence of the four-pulse signal at said input means.

No references cited.

NEIL C. READ, *Primary Examiner.*

H. I. PITTS, *Assistant Examiner.*